3,036,064
NEW N-HETEROCYCLIC COMPOUNDS
Walter Schindler, Riehen, near Basel, Switzerland, assignor to Geigy Chemical Corporation, Ardsley, N.Y., a corporation of Delaware
No Drawing. Filed Jan. 8, 1960, Ser. No. 1,174
Claims priority, application Switzerland Jan. 9, 1959
6 Claims. (Cl. 260—239)

The present invention concerns new N-heterocyclic compounds having valuable pharmacological properties as well as processes for the production thereof.

It has surprisingly been found that N-derivatives of 10.11-dihydro-5-dibenzo[b.f]azepines and 5-dibenzo[b.f]-azepines corresponding to the general formula

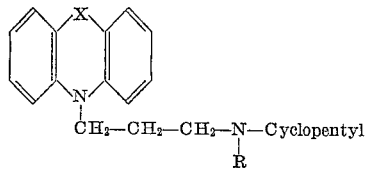

wherein X represents the ethylene or vinylene group —$CH_2$—$CH_2$— or —CH=CH— respectively, and R represents a low molecular alkyl radical, have valuable pharmacological properties, in particular anti-allergic, anti-convulsive and sedative activity. They can be used, among other purposes as anti-allergics, anti-convulsants, sedatives and for the treatment of certain forms of mental disorders, as well as to potentiate the action of other pharmaceuticals, in particular of anaesthetics.

Quaternary ammonium salts which are derived from the tertiary bases defined above, act as ganglioplegics.

The new compounds are produced by reacting, in the presence of a condensing agent, a 10.11-dihydro-5-dibenzo[b.f]azepine or 5-dibenzo[b.f]azepine which corresponds to the general formula

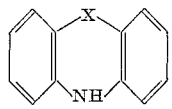

and which will be termed iminodibenzyl or iminostilbene in the following, with a reactive ester of an amino propanol of the general formula

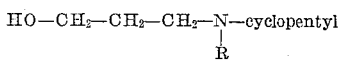

wherein X and R have the meanings given above.

Sodium amide, lithium amide, potassium amide, sodium or potassium, butyl lithium, phenyl lithium or lithium hydride are particularly suitable as condensing agents. The reaction can be performed in the presence or absence of an inert organic solvent of which benzene, toluene and xylenes are given as examples.

The halides in particular are used as reactive esters of amino propanols of the general Formula III; individually can be named: γ-(N-methyl-cyclopentylamino)-propyl chloride, γ-(N-ethyl-cyclopentylamino)-propyl chloride, γ-(N-n-propyl-cyclopentylamino)-propyl chloride as well as the corresponding bromides and iodides.

In addition, the new N-heterocyclic compounds of the general Formula I are also obtained by reacting a compound of the general formula

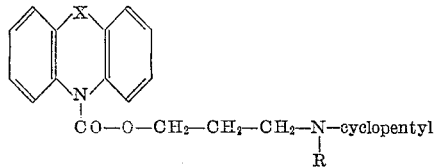

wherein X and R have the meanings given above, until one mol of carbon dioxide is split off. The compounds of the general Formula IV are obtained in their turn by reacting phosgene with a compound of the general Formula II and reacting the 5-chloro-carbonyl iminodibenzyl or iminostilbene obtained with an amino alcohol of the general Formula III.

A third process for the production of compounds of the general Formula I consists in reacting a reactive ester of a compound of the general formula

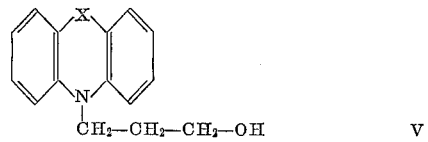

in particular a halide, with a secondary amine of the general formula

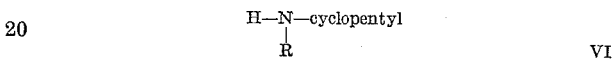

wherein X and R have the meanings given above. The reaction is performed for example at a moderately raised temperature of, e.g. 80–120°, in an inert solvent such as, e.g. a low molecular alkanol or alkanone. Advantageously an excess of the amine to be reacted is used as acid binding agent. If necessary, the reaction is performed in a closed vessel depending on the boiling point of the amine and solvent used and on the reaction temperature necessary. Reactive esters of compounds of the general Formula V are obtained, for example, by reacting alkali metal compounds of iminodibenzyl or iminostilbene of the general Formula II with alkylene oxides and reacting the hydroxyalkyl derivatives obtained with inorganic acid halides, methane sulphonic acid chloride or aryl sulphonic acid chlorides, whereupon 5-halogen alkyl iminodibenzyls, 5-methane sulphonyloxyalkyl-, 5-aryl sulphonyloxyalkyl-iminodibenzyls or the corresponding iminostilbene derivatives are obtained. Such compounds, however, are also obtained in a one-step process by reacting alkali metal compounds of iminodibenzyl or iminostilbene with non-geminate dihalogen alkanes, in particular with those having two different halogen atoms such as 1-chloro-3-bromopropane or with aryl sulphonic acid halogen alkyl esters. The reactive esters of compounds of the general Formula V can be reacted, for example, with N-methyl cyclopentylamine, N-ethyl cyclopentylamine, N-n-propyl cyclopentylamine or N-isopropyl cyclopentylamine.

Compounds of the general Formula I are obtained by a further process by treating a compound of the general formula

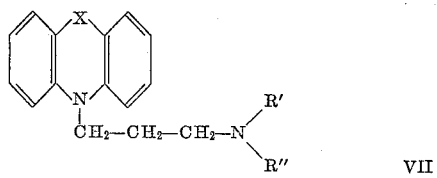

wherein one of the symbols R' and R" represents hydrogen and the other the cyclopentyl radical or a low molecular alkyl radical respectively and X has the meaning given above, with a low molecular alkylating agent or with a cyclopentylating agent respectively. Starting materials of the general Formula VII are obtained, for example, if analogously to the previous process, instead of a secondary amine of the general Formula VI, cyclopentylamine or a low molecular monoalkylamine is reacted with a reactive ester of a compound of the general Formula V. They are also obtained, for example, by hydrogenating 5-cyanoalkyl iminodibenzyl or iminostilbene in the presence of cyclopentanone or of a low molecular alkanone. As low molecular alkylating agents, for example, dimethyl sulphate, diethyl sulphate, methyl iodide, ethyl iodide, ethyl bromide, n-propyl bromide and p-toluene sulphonic acid methyl ester can be used in the presence of acid binding agents such as, e.g. sodium or potassium carbonate and an inert organic solvent. Also, for example, formaldehyde in the presence of formic acid can be used. Cyclopentyl bromide is named as cyclopentylating agent. Finally, compounds of the general Formula I are also produced by reacting compounds of the general formula

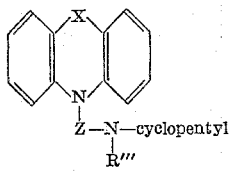

VIII wherein

Z and R''' are the trimethylene radical or the low molecular alkyl radical R respectively except that in at least one of them at least one methylene group attached to an N atom is replaced by a carbonyl group, and
X has the meaning given above, with an alkali metal-earth metal hydride, in particular with lithium-aluminium hydride.

Starting compounds of the general Formula VIII are, e.g. the 5-[β-(N-alkyl-cyclopentylamino)-propionyl]-iminodibenzyls and iminostilbenes. They are obtained, for example, by reacting alkali metal compounds of iminodibenzyl or iminostilbene with β-halogen propionic acid halides and then reacting the 5-(β-halogen propionyl) compounds obtained with suitable amines of the general Formula VI.

On reacting reactive esters, particularly halides or sulphates of aliphatic or araliphatic alcohols, e.g. methyl iodide, dimethyl sulphate, ethyl bromide, ethyl iodide or benzyl chloride, with tertiary amines of the general Formula I, monoquaternary ammonium compounds are formed in the usual way, it being the group

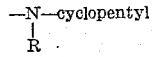

which reacts.

The tertiary bases form salts, some of which are water soluble, with inorganic or organic acids such as hydrochloric acid, hydrobromic acid, sulphuric acid, phosphoric acid, methane sulphonic acid, ethane disulphonic acid, acetic acid, citric acid, malic acid, succinic acid, fumaric acid, maleic acid, tartaric acid, benzoic acid and phthalic acid.

The following example further illustrates the production of the new compounds. Parts are given therein as parts by weight and their relationship to parts by volume is as that of grammes to cubic centimetres. The temperatures are in degrees centigrade.

*Example*

27.2 parts of 5(γ-chloropropyl)-iminodibenzyl are dissolved in 200 parts by volume of butanone, 14 parts of sodium iodide are added and then the whole is refluxed for 16 hours with 21 parts of N-methyl cyclopentylamine. The butanone is distilled off, water is added to the residue which is then thoroughly extracted with ether. Basic portions are removed from the ethereal solution by extracting three times with 2 N-hydrochloric acid. The clear aqueous extracts are made alkaline and the oil which separates is extracted with ether. After drying and concentrating the ether solution, the residue is distilled whereupon 5-[γ-(N-methyl-cyclopentylamino)-propyl]-iminodibenzyl passes over at 173–175° under 0.02 mm. pressure.

The hydrochloride is obtained in crystalline form by the addition of alcoholic hydrochloric acid. M.P. 185–187°.

In an analogous manner, on using 27.0 parts of 5-(γ-chloropropyl)-iminostilbene, 5-[γ-(N-methyl-cyclopentylamino)-propyl]-iminostilbene is obtained.

On the other hand, by reacting 23 parts of N-ethyl cyclopentylamine with 27.2 parts of 5-(γ-chloropropyl)-iminodibenzyl or with 27.0 parts of 5-(γ-chloropropyl)-iminostilbene, 5-[γ-(N-ethyl-cyclopentylamino)-propyl]-iminodibenzyl or 5-[γ-(N-ethyl-cyclopentylamino)-propyl]-iminostilbene are obtained in an analogous manner.

What I claim is:

1. An N-heterocyclic compound of the formula

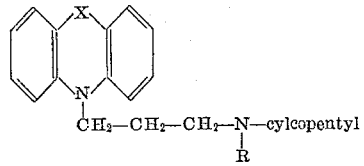

wherein X represents a member selected from the group consisting of the ethylene group —CH₂—CH₂— and the vinylene group —CH=CH—, and R represents a lower alkyl radical.

2. 5-[γ-(N-methyl-cyclopentylamino)-propyl]-iminodibenzyl.

3. The hydrochloride of 5-[γ-(N-methyl-cyclopentylamino)-propyl]-iminodibenzyl.

4. 5-[γ-(N-methyl-cyclopentylamino)-propyl]-iminostilbene.

5. 5-[γ-(N-ethyl-cyclopentylamino)-propyl]-iminostilbene.

6. 5-[γ-(N-ethyl-cyclopentylamino)-propyl]-iminodibenzyl.

References Cited in the file of this patent

UNITED STATES PATENTS

| | | |
|---|---|---|
| 2,554,736 | Haefliger et al. | May 29, 1951 |
| 2,716,134 | Reynolds et al. | Aug. 23, 1955 |
| 2,834,779 | Biel et al. | May 13, 1958 |

FOREIGN PATENTS

| | | |
|---|---|---|
| 200,578 | Austria | Nov. 10, 1958 |